(12) United States Patent
Roberts et al.

(10) Patent No.: US 8,815,979 B2
(45) Date of Patent: *Aug. 26, 2014

(54) AMPHOTERIC POLYURETHANE DISPERSANTS AND THEIR USE IN INKJET INKS

(75) Inventors: C. Chad Roberts, Hockessin, DE (US); Patrick F. McIntyre, West Chester, PA (US); Michael Stephen Wolfe, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/133,853

(22) PCT Filed: Dec. 11, 2009

(86) PCT No.: PCT/US2009/067679
§ 371 (c)(1),
(2), (4) Date: Jun. 9, 2011

(87) PCT Pub. No.: WO2010/068871
PCT Pub. Date: Jun. 17, 2010

(65) Prior Publication Data
US 2011/0245410 A1 Oct. 6, 2011

Related U.S. Application Data

(60) Provisional application No. 61/122,087, filed on Dec. 12, 2008.

(51) Int. Cl.
| | |
|---|---|
| B41J 2/01 | (2006.01) |
| B41J 2/17 | (2006.01) |
| B41J 2/175 | (2006.01) |
| C08G 18/08 | (2006.01) |
| C08G 18/28 | (2006.01) |
| C08J 3/00 | (2006.01) |
| C08K 3/20 | (2006.01) |
| C08L 75/00 | (2006.01) |
| C09D 5/00 | (2006.01) |
| C09D 11/00 | (2014.01) |
| G01D 11/00 | (2006.01) |

(52) U.S. Cl.
USPC ............ 523/160; 347/1; 347/85; 347/95; 347/100; 523/161; 524/589; 524/590; 524/591; 524/839; 524/840

(58) Field of Classification Search
USPC .......... 523/160, 161; 524/589, 590, 591, 839, 524/840; 347/1, 85, 95, 100
See application file for complete search history.

(56) References Cited

U.S. PATENT DOCUMENTS

| | | | |
|---|---|---|---|
| 4,036,801 A * | 7/1977 | Matsuda et al. | 524/591 |
| 4,490,728 A | 12/1984 | Vaught et al. | |
| 4,501,852 A | 2/1985 | Markusch et al. | |
| 4,647,643 A | 3/1987 | Zdrahala et al. | |
| 4,701,480 A | 10/1987 | Markusch et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,310,778 A | 5/1994 | Stor et al. | |
| 5,538,548 A * | 7/1996 | Yamazaki | 524/386 |
| 5,679,138 A | 10/1997 | Bishop et al. | |
| 5,700,851 A * | 12/1997 | Banning et al. | 523/161 |
| 5,891,231 A | 4/1999 | Gnerlich et al. | |
| 5,976,232 A | 11/1999 | Gore | |
| 5,990,245 A | 11/1999 | Esselborn et al. | |
| 6,161,918 A | 12/2000 | Bailey et al. | |
| 6,248,839 B1 | 6/2001 | Esselborn et al. | |
| 6,648,463 B2 | 11/2003 | Koga et al. | |
| 2003/0089277 A1 | 5/2003 | Zakheim et al. | |

FOREIGN PATENT DOCUMENTS

WO 2007/044228 9/2006

* cited by examiner

*Primary Examiner* — Patrick Niland
(74) *Attorney, Agent, or Firm* — John H. Lamming

(57) ABSTRACT

The disclosure provides an aqueous dispersion and ink jet inks comprising a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates having improved bleed control, and optical density/chroma.

20 Claims, No Drawings

AMPHOTERIC POLYURETHANE DISPERSANTS AND THEIR USE IN INKJET INKS

CROSS-REFERENCE TO RELATED APPLICATION

This application claims priority from U.S. Provisional Application Ser. No. 61/122,087 filed Dec. 12, 2008.

BACKGROUND OF THE DISCLOSURE

The present disclosure relates to an aqueous inkjet ink comprising a colorant, more typically a carbon black pigment, stabilized by a certain amphoteric polyurethane dispersant. The disclosure further relates to an ink set comprising this ink and to a method of printing with the ink set.

Inkjet printing is a non-impact printing process in which droplets of ink are deposited on a substrate, such as paper, to form the desired image. The droplets are ejected from a printhead in response to electrical signals generated by a microprocessor.

Most inkjet printers are equipped with an ink set comprising two or more different inks and are able to print black text and multicolor images. Typically, an ink set will comprise at least a cyan, magenta and yellow colored ink and a black ink (CMYK ink set).

For printing text, it is desirable for the black ink to have high optical density. For this purpose, a pigment or disperse dye is most advantageous, especially a carbon black pigment. A pigment colorant is not soluble in the ink vehicle and must be treated in order to cause it to remain dispersed and jet properly.

To affect their dispersion stability, pigments are commonly treated with dispersants, and a wide variety of such materials have been disclosed.

For CMYK ink sets comprising a pigmented black ink, it is known to print the black ink in an adjacent relationship with one or more of the colored inks to improve the print quality of the black ink when the one or more colored ink(s) are formulated with an ingredient that destabilizes the black pigment dispersion for improved black-to-color bleed control and thus improved print quality.

Despite the successful inkjet inks and print methods presently available, there is still a need for, and it is an objective of this disclosure to provide, inks and methods having even better print quality and jetting reliability.

SUMMARY OF THE DISCLOSURE

An embodiment provides an aqueous dispersion comprising a colorant and amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates.

A further embodiment provides the aqueous dispersion wherein the reaction product further comprises at least one urethane monomer comprising a polyol having at least two alcohol functionalities.

A further embodiment provides the aqueous dispersion wherein the basic amine urethane monomer comprises an ionic group.

A further embodiment provides the aqueous dispersion wherein the ionic group is selected from the group consisting essentially of a primary amine (—NH2), a secondary amine (—NRH), and a tertiary amine, (NR2).

Yet another embodiment provides the aqueous dispersion wherein the acidic urethane monomer comprises an ionic group.

Yet another embodiment provides the aqueous dispersion wherein ionic group is selected from the group consisting essentially of a carboxylic group (—COOH), phosphate group (—OPO3 M2), phosphonate group (—PO3 M2), and a sulfonate group (—SO3 M).

Yet another embodiment provides the aqueous dispersion wherein the amphoteric polyurethane dispersant is a random polymer.

Another embodiment provides the aqueous dispersion wherein the dispersion has a pH of >7.

Another embodiment provides the aqueous dispersion wherein the amphoteric polyurethane dispersant has a number average molecular weight (Mn) of between about 2000 and about 20,000 Daltons.

Yet another embodiment provides the aqueous dispersion wherein the amphoteric polyurethane dispersant has an acid number of between about 20 and about 150 (mg KOH to neutralize 1 gram of polymer solids).

Yet another embodiment provides the aqueous dispersion wherein the amphoteric polyurethane dispersant has an amine number and an acid number, and the ratio of the amine number to acid number is about 0.5 to about 1.5.

Another embodiment provides the aqueous dispersion wherein the ratio of the amine number to acid number is about 0.7 to about 1.2.

Another embodiment provides the aqueous dispersion wherein the amphoteric polyurethane dispersant comprises at least one compound of the general structure (I):

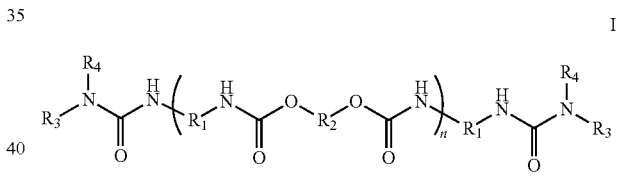

I $R_1 = C_4$-$C_{20}$ alkyl, substituted $C_4$-$C_{20}$ alkyl, substituted $C_4$-$C_{20}$ alkyl/aryl 15 from diisocyanate;
$R_2$=a mixture comprising at least one $Z_1$, at least one $Z_2$, and at least one $Z_3$;
$R_3 = C_3$-$C_{20}$ alkyl/branched alkyl with possible ether spacer atoms, and an optional isocyanate reactive group from an amine terminating or chain extending component
$R_4$=hydrogen, $C_3$-$C_{20}$ alkyl/branched $C_3$-$C_{20}$ alkyl with possible ether spacer atoms, and an optional isocyanate reactive group from an amine terminating group
where the isocyanate reactive group is selected from hydroxyl, carboxyl, mercapto, or amido;
$Z_1$=acid urethane monomer unit derived from acid functional diol;
$Z_2$=basic amine urethane monomer derived from tertiary amine functional diol,
$Z_3$ is selected from polyester, polyether, polycarbonate, polyestercarbonate, and polyacrylate diols; and wherein the urea content of the urea-terminated polyurethane is at least 2 wt % of the polyurethane and at most about 14 wt % of the polyurethane.

Another embodiment provides the aqueous dispersion wherein the colorant is a pigment.

Another embodiment provides the aqueous dispersion wherein the pigment is a black pigment.

An embodiment provides an ink jet ink comprising an aqueous dispersion, wherein the aqueous dispersion comprises a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates.

Another embodiment provides the ink jet ink further comprising an ink vehicle.

Another embodiment provides the ink jet ink wherein the ink vehicle is water or a mixture of water and an organic solvent.

Another embodiment provides the ink jet ink wherein the reaction product further comprises at least one urethane monomer comprising a polyol having at least two alcohol functionalities.

Yet another embodiment provides the ink jet ink wherein the basic amine urethane monomer comprises an ionic group.

Yet another embodiment provides the ink jet ink wherein the ionic group is selected from the group consisting essentially of a primary amine (—NH2), a secondary amine (—NRH), and a tertiary amine, (NR2).

Another embodiment provides the ink jet ink wherein the acidic urethane monomer comprises an ionic group.

Another embodiment provides the ink jet ink wherein ionic group is selected from the group consisting essentially of a carboxylic group (—COOH), phosphate group (—OPO3 M2), phosphonate group (—PO3 M2), and a sulfonate group (—SO3 M).

Another embodiment provides the ink jet ink 16 wherein the amphoteric polyurethane dispersant is a random polymer.

Yet another embodiment provides the ink jet ink wherein the dispersion has a pH of >7.

Yet another embodiment provides the ink jet ink wherein the amphoteric polyurethane dispersant has a number average molecular weight (Mn) of between about 2000 and about 20,000 Daltons.

Yet another embodiment provides the ink jet ink wherein the amphoteric polyurethane dispersant has an acid number of between about 20 and about 150 (mg KOH to neutralize 1 gram of polymer solids).

Another embodiment provides the ink jet ink wherein the amphoteric polyurethane dispersant has an amine number and an acid number, and the ratio of the amine number to acid number is about 0.5 to about 1.5.

Another embodiment provides the ink jet ink wherein the ratio of the amine number to acid number is about 0.7 to about 1.2.

Yet another embodiment provides the ink jet ink wherein the reaction product further comprises at least one urethane monomer comprising a polyol having at least two alcohol functionalities.

Yet another embodiment provides the ink jet ink wherein the amphoteric polyurethane dispersant is present in the amount of about 0.3% to about 5.0%, based on the total weight of the ink.

Yet another embodiment provides the ink jet ink wherein the amphoteric polyurethane dispersant comprises at least one compound of the general structure (I):

$R_1$=$C_4$-$C_{20}$ alkyl, substituted $C_4$-$C_{20}$ alkyl, substituted $C_4$-$C_{20}$ alkyl/aryl from diisocyanate;

$R_2$=a mixture comprising at least one $Z_1$, at least one $Z_2$, and at least one $Z_3$;

$R_3$=$C_4$-$C_{20}$ alkyl/branched alkyl with possible ether spacer atoms, and an optional isocyanate reactive group from an amine terminating or chain extending component;

$R_4$=hydrogen, $C_4$-$C_{20}$ alkyl/branched $C_4$-$C_{20}$ alkyl with possible ether spacer atoms, and an optional isocyanate reactive group from an amine terminating group;

where the isocyanate reactive group is selected from hydroxyl, carboxyl, mercapto, or amido;

$Z_1$=acid urethane monomer unit derived from acid functional diol;

$Z_2$=basic amine urethane monomer derived from tertiary amine functional diol;

$Z_3$ is selected from polyester, polyether, polycarbonate, polyestercarbonate, and polyacrylate diols; and wherein the urea content of the urea-terminated polyurethane is at least 2 wt % of the polyurethane and at most about 14 wt % of the polyurethane.

An embodiment provides an ink set comprising a first ink and a second ink, wherein the first ink comprises an aqueous dispersion comprising colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates; and the second ink comprises a second aqueous vehicle and reactive species that can destabilize the aqueous dispersion of said first ink.

Another embodiment provides the ink set wherein the reactive species is selected from the group consisting essentially of a cationic agent, salt, and a pH modifying agent.

Another embodiment provides the ink set wherein the reactive species is structurally part of a colorant in the second ink.

Yet another embodiment provides the ink set wherein the second ink is a colorless ink containing the reactive species.

Yet another embodiment provides the ink set wherein the second ink further comprises a colorant.

Yet another embodiment provides the ink set wherein the colorant is a dye.

Yet another embodiment provides the ink set wherein the reaction product further comprises at least one urethane monomer comprising a polyol having at least two alcohol functionalities.

Another embodiment provides the ink set wherein the basic amine urethane monomer comprises an ionic group, wherein the ionic group is selected from the group consisting essentially of a primary amine (—NH2), a secondary amine (—NRH), and a tertiary amine, (NR2).

An embodiment provides the ink set wherein the acidic urethane monomer comprises an ionic group, wherein the ionic group is selected from the group consisting essentially of a carboxylic group (—COOH), phosphate group (—OPO3 M2), phosphonate group (—PO3 M2), and a sulfonate group (—SO3 M).

Another embodiment provides the ink set wherein the amphoteric polyurethane dispersant is a random polymer.

Another embodiment provides the ink set of wherein the aqueous dispersion has a pH of >7.

Yet another embodiment provides the ink set wherein the amphoteric polyurethane dispersant has a number average molecular weight (Mn) of between about 2000 and about 20,000 Daltons.

Yet another embodiment provides the ink set wherein the amphoteric polyurethane dispersant has an acid number of between about 20 and about 150 (mg KOH to neutralize 1 gram of polymer solids).

Another embodiment provides the ink set wherein the amphoteric polyurethane dispersant has an amine number and an acid number, and the ratio of the amine number to acid number is about 0.5 to about 1.5.

Another embodiment provides the ink set wherein the ratio of the amine number to acid number is about 0.7 to about 1.2.

Yet another embodiment provides the ink set wherein the reaction product further comprises at least one urethane monomer comprising a polyol having at least two alcohol functionalities.

Yet another embodiment provides the ink set wherein the amphoteric polyurethane dispersant comprises at least one compound of the general structure (I):

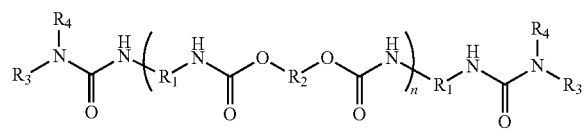

I $R_1 = C_4$-$C_{20}$ alkyl, substituted $C_4$-$C_{20}$ alkyl, substituted $C_4$-$C_{20}$ alkyl/aryl from diisocyanate;
$R_2 =$ a mixture comprising at least one $Z_1$, at least one $Z_2$, and at least one $Z_3$;
$R_3 = C_4$-$C_{20}$ alkyl/branched alkyl with possible ether spacer atoms, and an optional isocyanate reactive group from an amine terminating or chain extending component;
$R_4 =$ hydrogen, $C_4$-$C_{20}$ alkyl/branched $C_4$-$C_{20}$ alkyl with possible ether 10 spacer atoms, and an optional isocyanate reactive group from an amine terminating group;
where the isocyanate reactive group is selected from hydroxyl, carboxyl, mercapto, or amido;
$Z_1 =$ acid urethane monomer unit derived from acid functional diol;
$Z_2 =$ basic amine urethane monomer derived from tertiary amine functional diol;
$Z_3$ is selected from polyester, polyether, polycarbonate, polyestercarbonate, and polyacrylate diols; and wherein the urea content of the urea-terminated polyurethane is at least 2 wt % of the polyurethane and at most about 14 wt % of the polyurethane.

An embodiment provides a method of inkjet printing on a substrate, comprising the steps of:
  (a) providing an ink jet printer that prints in response to digital data signals;
  (b) loading the printer with a substrate to be printed;
  (c) loading the printer with an ink set comprising at least a first and second ink, wherein the first ink comprises an aqueous dispersion comprising colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates; and the second ink comprises a second aqueous vehicle; and wherein the second ink or the substrate comprise a reactive species with appropriate cationic agent, salt, or pH modifying agent that can destabilize the aqueous dispersion of said first ink;
  (d) printing said first and second ink on the substrate, in an abutting relationship to each other.

Another embodiment provides the method of inkjet printing wherein the substrate is pretreated with the reactive species.

Another embodiment provides the method of inkjet printing of wherein the second ink comprises the reactive species.

Another embodiment provides a printer comprising an ink jet ink, wherein the ink jet ink comprises an aqueous dispersion comprising a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates.

These and other features and advantages of the present disclosure will be more readily understood by those of ordinary skill in the art from a reading of the following detailed description. It is to be appreciated that certain features of the disclosure which are, for clarity, described above and below in the context of separate embodiments, can also be provided in combination in a single embodiment. Conversely, various features of the disclosure that are, for brevity, described in the context of a single embodiment, can also be provided separately or in any subcombination. In addition, references in the singular can also include the plural (for example, "a" and "an" can refer to one, or one or more) unless the context specifically states otherwise. Further, values stated in ranges include each and every value within that range.

DETAILED DESCRIPTION

Colorant Containing Ink

The colorant containing ink comprises a first aqueous vehicle, a colorant containing dispersion comprising a colorant, more typically a carbon black pigment, and an amphoteric polyurethane dispersant. Optionally the colorant containing ink further comprises other ingredients.

Aqueous Dispersion

The colorant that can be a pigment or a disperse dye, and more typically a raw carbon black pigment, is insoluble and non-dispersible in the ink vehicle and must be treated in order to form a stable dispersion. According to the present disclosure, the colorant is stabilized in the aqueous vehicle by treatment with an amphoteric polyurethane dispersant comprising at least one basic amine urethane monomer and at least one acidic urethane monomer.

The aqueous dispersion has a pH of >7, and the amphoteric polyurethane dispersant has a number average molecular weight (Mn) of between about 2000 and about 20,000 Daltons, more typically between about 3,000 and about 16,000 Daltons, and an acid number of between about 20 and about 150 (mg KOH to neutralize 1 gram of polymer solids), more typically between about 30 and about 100.

The ratio of the amine to acid number is typically 0.5 to 1.5, and more typically 0.7 to 1.2. This ratio determines the pH sensitivity of the pigment dispersion which is related to the isoelectric point or the pH at which all the cationic and anionic charges on the polymer sum to zero. For the dispersants of this disclosure, the isoelectric point is typically a pH of 5.0 to 8.0, and more typically a pH of 5.2 to 7.6. The ratio is balanced to optimize the pigment dispersion stability in the ink and the end-use properties when printed in the presence of a reactive ink.

The weight ratio of pigment to dispersant (P/D) is typically between about 0.5 and about 5. The acid groups on the dispersant polymer will typically be partially or completely neutralized with base to the salt form. Some examples of useful bases include alkali metal hydroxides (lithium, sodium, and potassium hydroxide), alkali metal carbonate and bicarbonate (sodium and potassium carbonate and bicarbonate), organic amines (mono-, di-, tri-methylamine, morpholine, N-methylmorpholine), organic alcohol amines (N,N-dimethylethanolamine, N-methyl diethanolamine, mono-, di-, triethanolamine), ammonium salts (ammonium hydroxide, tetra-alkyl ammonium hydroxide), and pyridine.

The amphoteric polymeric dispersant is present in the amount of about 0.3% to about 5.0%, more typically about 1.0% to about 2.5%, 5 based on the total weight of the colorant containing ink.

Amphoteric Polyurethane Dispersant

The amphoteric polyurethane dispersant comprises a reaction product of at least one basic amine urethane monomer, at least one acidic urethane monomer, and at least one urethane monomer comprising two or more isocyanates. Optionally, the amphoteric polyurethane dispersant further comprises at least one urethane monomer comprising two or more alcohols.

Acidic and Basic Urethane Monomers

The acidic urethane monomers and basic amine urethane monomers are hydrophilic reactants containing ionic and/or ionizable groups (potentially ionic groups). Preferably, these reactants will contain one or two, more preferably two, isocyanate reactive groups, as well as at least one ionic or ionizable group. In the structural description of the amphoteric polyurethane described herein the reactant containing the ionic group is designated as $Z_1$ and $Z_2$.

Some suitable basic amine urethane monomers comprise a basic functionality and two or more urethane reactive group such as an isocyante or alcohol. The basic functionality is selected from the group consisting essentially of a primary amine (—NH2), secondary amine (—NRH), tertiary amine (—NR2), and quaternary (—N+R3). More typically the basic functionality is a tertiary amine. Some suitable basic amine urethane monomers are selected from the group consisting essentially of N-methyldiethanolamine, N,N-diethanolaniline, N,N'-diethanol piperazine, 3-dimethylamino-1,2-propane diol, 3-pyrrolidone-1,2-propane diol, 3-(4-morpholinyl)-1,2-Propanediol, 3-Piperidino-1,2-propanediol, 2,6-bis (hydroxymethyl)pyridine and respective quaternary ammonium salts from the reaction with alkyl halide.

Suitable acidic urethane monomers comprise an acidic functionality and two or more urethane reactive group such as an isocyante or alcohol. The acidic functionality is selected from the group consisting essentially of a carboxylic group, sulphonic acid group, sulphonate group, phosphoric acid group, and phosphonate group. Some suitable acidic urethane monomers are selected from the group consisting essentially of sulfonated toluene diisocyanate, sulfonated diphenylmethanediisocyanate, dimethylolacetic acid, dihydroxy alkanoic acids, and sulfonate diol compounds. Examples of dihydroxy alkanoic acids include 2,2'-dimethylolbutanoic acid, 2,2' dimethylolpropionic acid, and 2,2'-dimethylolbutyric acid. The most typical dihydroxy alkanoic acid is 2,2' dimethylolpropionic acid ("DMPA"). Some suitable sulfonate diol compounds also include hydroxyl terminated copolyethers comprising repeat units derived from a diol and a sulfonated dicarboxylic acid such as 5-sulfo-isophthalic acid prepared as described in previously incorporated U.S. Pat. No. 6,316,586. Suitable sulfonates also include $H_2N$—$CH_2$—$CH_2$—$NH$—$(CH_2)_r$—$SO_3Na$, wherein r=2 or 3; and $HOCH_2CH_2C(SO_3Na)$—$CH2$-$OH$.

Polyisocyanate Component

The urethane monomer comprising two or more isocyanates typically comprises polyisocyanates containing either aromatic, cycloaliphatic or aliphatic groups bound to the isocyanate groups. Mixtures of these compounds can also be used. Typical are compounds with isocyanates bound to a cycloaliphatic or aliphatic moieties. If aromatic isocyanates are used, cycloaliphatic or aliphatic isocyanates are more typically present as well.

Diisocyanates are typical, and any diisocyanate useful in preparing polyurethanes and/or polyurethane-ureas, diisocyanates and diols or amine can be used in this invention.

Some examples of suitable diisocyanates include 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}MDI$); 3,3'-dimethyl-4,4'-biphenyl diisocyanate (TODI); Dodecane diisocyanate ($C_{12}DI$); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof. IPDI and TMXDI are more typical.

Optional Other Isocyanate-Reactive Components

Optional urethane monomers comprising two or more alcohols include polyhydroxy compounds, typically diols. These polymeric diols are best defined by their number average molecular weight, and can range from about 100 to about 3000, more typically from about 200 to about 2000, and most typically from about 200 to about 1000.

Some examples of polymeric polyols include polyesters, polyethers, polycarbonates, polyacetals, poly(meth)acrylates, polyester amides, polythioethers and mixed polymers such as a polyester-polycarbonates where both ester and carbonate linkages are found in the same polymer. A combination of these polymers can also be used. For example, a polyester polyol and a poly(meth)acrylate polyol can be used in the same polyurethane synthesis.

Typical polyester diols are hydroxyl terminated poly(butylene adipate), poly(butylene succinate), poly(ethylene adipate), poly(1,2-propylene adipate), poly(trimethylene adipate), poly(trimethylene succinate), polylactic acid ester diol and polycaprolactone diol. Other hydroxyl terminated polyester diols are copolyethers comprising repeat units derived from a diol and a sulfonated dicarboxylic acid and prepared as described in U.S. Pat. No. 6,316,586 (the disclosure of which is incorporated by reference herein for all purposes as if fully set forth). A typical sulfonated dicarboxylic acid is 5-sulfoisophthalic acid, and a typical diol is 1,3-propanediol.

Suitable polyether polyols are obtained in a known manner by the reaction of starting compounds that contain reactive hydrogen atoms with alkylene oxides such as ethylene oxide, propylene oxide, butylene oxide, styrene oxide, tetrahydrofuran, epichlorohydrin or mixtures of these. Polyether diols based on 1,3-propane diol and the linear co-polyether diols may be obtained as described in U.S. Pat. No. 6,720,459.

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol, higher polyether diols with phosgene, diarylcarbonates such as diphenylcarbonate, dialkylcarbonates such as diethylcarbonate or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Polycarbonate diols are typically selected from the group consisting of polyethylene carbonate diol, polytrimethylene carbonate diol, polybutylene carbonate diol and polyhexylene carbonate.

Poly(meth)acrylates containing hydroxyl groups include those common in the art of addition polymerization such as cationic, anionic and radical polymerization and the like. An example is alpha-omega diols. Examples of these type of diols are those which are prepared by a "living" or "control" or chain transfer polymerization processes which enables the placement of one hydroxyl group at or near the termini of the polymer. U.S. Pat. No. 6,248,839 and U.S. Pat. No. 5,990,245, the disclosures of which have examples of protocol for making terminal diols. Other di-NCO reactive poly(meth)acrylate terminal polymers can be used. An example would be end groups other than hydroxyl such as amino or thiol, and can also include mixed end groups with hydroxyl.

Polyolefin diols are available from Shell as KRATON LIQUID L and Mitsubishi Chemical as POLYTAIL H.

Silicone glycols are well known, and representative examples are described in U.S. Pat. No. 4,647,643.

In addition to the above-mentioned components, which are typically difunctional in the isocyanate polyaddition reaction, mono-functional and even small portions of trifunctional and higher functional components generally known in polyurethane chemistry, such as trimethylolpropane or 4-isocyanatomethyl-1,8-octamethylene diisocyanate, can be used in cases in which branching of the NCO prepolymer or polyurethane is desired.

It is, however, typical that the NCO-functional prepolymers should be substantially linear, and this can be achieved by maintaining the average functionality of the prepolymer starting components at or below 2:1.

Similar NCO reactive materials can be used as described for hydroxy containing compounds and polymers, but which contain other NCO reactive groups. Examples would be dithiols, diamines, thioamines and even hydroxythiols and hydroxylamines. These can either be compounds or polymers with the molecular weights or number average molecular weights as described for the polyols.

Optional Chain Termination Reactant

The terminating agent is a primary or secondary monoamine which is added to make the urea termination. In Structure (I) the terminating agent is shown as $R_3(R_4)N$— substituent on the polyurethane. The substitution pattern for $R_3$ and $R_4$ include hydrogen, alkyl, a substituted/branched alkyl, isocyanate reactive where the substituent can be an isocyanate reactive group selected from hydroxyl, carboxyl, mercapto, amido and other ones which have less isocyanate reactivity than primary or secondary amine. At least one of the $R_3$ and $R_4$ must be other than hydrogen.

The amount of chain terminator employed should be approximately equivalent to the unreacted isocyanate groups in the prepolymer. The ratio of active hydrogens from amine in the chain terminator to isocyanate groups in the prepolymer preferably being in the range from about 1.0:1 to about 1.2:1, more preferably from about 1.0:1.1 to about 1.1:1, and still more preferably from about 1.0:1.05 to about 1.1:1, on an equivalent basis. Although any isocyanate groups that are not terminated with an amine can react with other isocyanate reactive functional group and water the ratios of chain termination to isocyanate group is chosen to assure urea termination. Amine termination of the polyurethane is avoided by the choice and amount of chain terminating agent leading to a urea terminated polyurethane which has improved molecular weight control and improved properties as a particle dispersant.

Aliphatic primary or secondary monoamines are preferred. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl)amine, diethylamine, bis(methoxyethyl)amine, N-methylstearyl amine, diethanolamine and N-methyl aniline. A preferred isocyanate reactive chain terminator is bis(methoxyethyl)amine(BMEA). The bis(methoxyethyl)amine is part of a preferred class of urea terminating reactant where the substituents are non reactive in the isocyanate chemistry, but are nonionic hydrophilic groups. This nonionic hydrophilic group provides the amphoteric polyurethane with more water compatible.

Any primary or secondary monoamines substituted with less isocyanate reactive groups may be used as chain terminators. Less isocyanate reactive groups could be hydroxyl, carboxyl, amide and mercapto. Example of monoamines useful as chain terminators include but are not restricted to monoethanolamine, 3-amino-1-propanol, isopropanolamine, N-ethylethanolamine, diisopropanolamine, 6-aminocaproic acid, 8-aminocaprylic acid, 3-aminoadipic acid, and lysine. Chain terminating agents may include those with two less isocyanate reactive groups such as glutamine. A preferred isocyanate reactive chain terminator is diethanolamine. The diethanolamine is part of a preferred class of urea terminating reactant where the substituents are hydroxyl functionalities which can provide improved pigment wetting. The relative reactivity of the amine versus the less isocyanate reactive group and the mole ratios of NCO and the chain terminating amine produce the urea terminated polyurethane.

The urea content of the urea-terminated polyurethane in weight percent of the polyurethane is determined by dividing the mass of chain terminator by the sum of the other polyurethane components including the chain terminating agent. The urea content is from about 0.75 wt % to about 14 wt %. The urea content is preferably from about 2.5 wt % to about 10.5 wt %. The 0.75 wt % occurs when the polyether diols used are large, for instance Mn is greater than about 4000 and/or the molecular weight of the isocyanate is high.

A chain extending agent may be desired for polyurethanes in the higher molecular weight range. Suitable examples of chain extending agents are polyamine compounds. Polyamines include 1-amino-3-aminomethyl-3,5,5-trimethylcy-clohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

Preferred Structure of Amphoteric Polyurethane

In the preferred embodiment, the polyurethane dispersant has the following idealized structure wherein the amphoteric polyurethane comprises at least one compound of the general structure (I):

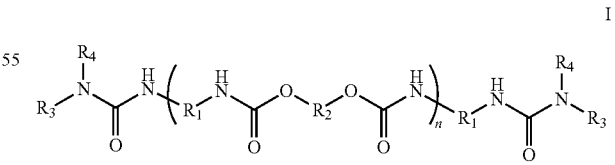

I $R_1=C_4$-$C_{20}$ alkyl, substituted $C_4$-$C_{20}$ alkyl, substituted $C_4$-$C_{20}$ alkyl/aryl from diisocyanate;

$R_2$=a mixture comprising at least one $Z_1$, at least one $Z_2$, and at least one $Z_3$;

$R_3=C_4$-$C_{20}$ alkyl/branched alkyl with possible ether spacer atoms, and an optional isocyanate reactive group from an amine terminating or chain extending component;

$R_4$=hydrogen, $C_4$-$C_{20}$ alkyl/branched $C_4$-$C_{20}$ alkyl with possible ether spacer atoms, and an optional isocyanate reactive group from an amine terminating group;

where the isocyanate reactive group is selected from hydroxyl, carboxyl, mercapto, or amido;

$Z_1$=acid urethane monomer unit derived from acid functional diol;

$Z_2$=basic amine urethane monomer derived from tertiary amine functional diol;

$Z_3$ is selected from polyester, polyether, polycarbonate, polyestercarbonate, and polyacrylate diols; wherein the urea content of the urea-terminated polyurethane is at least 2 wt % of the polyurethane and at most about 14 wt % of the polyurethane.

Amphoteric Polyurethane Dispersant Preparation

The process of preparing the dispersions of the disclosure begins with preparation of the polyurethane, which can be prepared by mixture or stepwise methods. The typical physical form of the polyurethane is as a dispersion. These amphoteric polyurethanes can behave as a dispersant for a particle, such as a pigment. In this case, the polyurethane is either 1) utilized as a dissolved polyurethane in a compatible solvent where the initial polyurethane/particle mixture is prepared and then processed using dispersion equipment to produce the polyurethane dispersed particle; or 2) the polyurethane dispersion and the particle dispersed are mixed in a compatible solvent system which, in turn is processed using dispersion equipment to produce the amphoteric polyurethane dispersed particle.

In the mixture process for preparing the amphoteric polyurethane, an isocyanate terminated polyurethane is prepared by mixing, in the presence of suitable solvent, at least one basic amine urethane monomer, typically a diol, at least one acidic urethane monomer, typically a diol, at least one urethane monomer comprising two or more isocyanates, and optionally, at least one urethane monomer comprising a polyol having at least two alcohol functionalities. This reaction can be conducted at from about 40° C. to about 100° C., and more typically from about 50° C. to about 90° C. The typical ratio of isocyanate to isocyanate reactive groups can be from about 1.3:1 to about 1.05:1, and more typically from about 1.25:1 to about 1.1:1. This isocyanate terminated polyurethane is often called a polyurethane prepolymer prior to the reaction with the chain terminating agent. When the targeted percent isocyanate is reached, then the optional chain termination reactant (primary or secondary amine) can be added, and then base or acid can be added to neutralize ionizable moieties incorporated from the ionizable reagent. Alternately, chain extending agent during or immediately after water dispersion may be added to increase the polyurethane molecular weight. The polyurethane solution can be then converted to an aqueous polyurethane dispersion via the addition of water under high shear. If present, the volatile solvent can be distilled under reduced pressure or other means.

If some cases, addition of neutralization agent, typically tertiary amines, can be beneficially added during early stages of the polyurethane synthesis. Alternately, advantages can be achieved via the addition of the neutralization agent, typically alkali base, simultaneously along with the water of inversion at high shear.

In the stepwise method, isocyanate terminated polyurethane can be prepared by dissolving the basic amine urethane monomer and/or the acidic urethane monomer, typically diols, along with optional other isocyanate-reactive components in solvent, and then adding diisocyanate to the mixture. Once the initial percent isocyanate target is reached, the polyol component can be added. This reaction can be conducted at from about 40° C. to about 100° C., and more typically from about 50° C. to about 90° C. The typical ratio of isocyanate to isocyanate reactive groups is from about 1.3:1 to about 1.05:1, and more typically from about 1.25:1 to about 1.1:1. Alternately, one of the ionic diols ($Z_1$ or $Z_2$ component) and/or optional other Isocyanate-Reactive components, preferably, polyols, and the other ionic reactant ($Z_1$ or $Z_2$ component) can be added after the initial percent isocyanate target is reached. When the final targeted percent isocyanate is reached for the polyurethane prepolymer, then the optional chain termination reactant (primary or secondary amine) can be added, and then base or acid can be added to neutralize ionizable moieties incorporated from the ionizable reagent. Alternately, chain extending agent during or immediately after water dispersion may be added to increase the polyurethane molecular weight. The polyurethane solution can then be converted to an aqueous polyurethane dispersion via the addition of water under high shear. If present, the volatile solvent can be distilled under reduced pressure.

In all polyurethane reaction schemes if the neutralization reactant has isocyanate reaction capability, (for example an alcohol, primary amine or secondary amine) it cannot be added prior to the chain terminating, urea forming amine. If the neutralization agent can function as a chain terminating reactant according to Structure (I) then it must be added after all of the other isocyanate reactive groups have been reacted.

Catalysts are not necessary to prepare the polyurethanes, but can provide advantages in their manufacture. The catalysts most widely used are tertiary amines and organo-tin compounds such as stannous octoate, dibutyltin dioctoate, dibutyltin dilaurate.

Preparation of the Polyurethane for Subsequent Conversion to a dispersion can be facilitated by using solvent. Suitable solvents are those that are miscible with water and inert to isocyanates and other reactants utilized in forming the polyurethanes. If it is desired to prepare a solvent-free dispersion, then it is typical to use a solvent with a high enough volatility to allow removal by distillation. However, polymerizable vinyl compounds can also be used as solvents, followed by free radical polymerization after inversion, thus forming a polyurethane acrylic hybrid dispersion. Typical solvents useful in the practice of the disclosure are acetone, methyl ethyl ketone, toluene, tetraglyme, sulfolane, and N-methyl pyrollidone. Typically the amount of solvent used in the reaction will be from about 10% to about 50%, more typically from about 20% to about 40% of the weight. Alternatively, the polyurethane can be prepared in a melt with less than 5% solvent.

Process conditions for preparing the NCO containing prepolymers have been discussed in the publications previously noted. The finished NCO-containing prepolymer should have a isocyanate content of about 1 to about 20%, typically about 1 to about 10% by weight, based on the weight of prepolymer solids.

Mixtures of compounds and/or polymers having mixed NCO reactive groups are also possible.

The process conditions used for preparing the amphoteric polyurethane of the present disclosure generally results in a polyurethane polymer of Structure I being present in the final product. However, it is understood that the final product will typically be a mixture of products, of which a portion is the desired polyurethane polymer, the other portion being a normal distribution of other polymer products and can contain varying ratios of unreacted monomers. The heterogeneity of the resultant polymer will depend on the reactants selected and reactant conditions chosen, as will be apparent to those skilled in the art.

Polyurethane Neutralization

In order to have a stable dispersion, a sufficient amount of the ionic groups must be neutralized so that, the resulting polyurethane will remain stably dispersed in the aqueous medium. Generally, at least about 70%, typically at least about 80%, of the acid groups are neutralized to the corresponding carboxylate salt groups. Alternatively, cationic groups in the polyurethane can be quaternary ammonium groups (—$NR_3Y$, wherein Y is a monovalent anion such as chlorine or hydroxyl).

Suitable neutralizing agents for converting the acid groups to salt groups include tertiary amines, alkali metal cations and ammonia. Examples of these neutralizing agents are disclosed in previously incorporated U.S. Pat. No. 4,701,480, as well as U.S. Pat. No. 4,501,852. Typical neutralizing agents are the trialkyl-substituted tertiary amines, such as triethyl amine, tripropyl amine, dimethylcyclohexyl amine, dimethylethanol amine, and triethanol amine and dimethylethyl amine. Substituted amines are also useful neutralizing groups such as diethyl ethanol amine or diethanol methyl amine.

Neutralization can take place at any point in the process. Typical procedures include at least some neutralization of the prepolymer, which is then chain extended/terminated in water in the presence of additional neutralizing agent.

The polyurethane dispersion that is used as the dispersant is a stable aqueous dispersion of polyurethane particles having a solids content of up to about 60% by weight, typically from about 10 to about 60% by weight, and more typically from about 25 to about 45% by weight. However, it is always possible to dilute the dispersions to any minimum amount that can be used when the polyurethane is used as a dispersant. The solids content of the resulting dispersion can be determined by drying the sample in an oven at about 150° C. for about 2 hours and comparing the weights before and after drying. The particle size is generally below about 1.0 micron, and typically between about 0.01 to about 0.5 micron. The average particle size should be less than about 0.5 micron, and typically between about 0.01 to about 0.3 micron. The small particle size enhances the stability of the dispersed polyurethane particles In accordance with the present invention the term "aqueous polyurethane dispersion" refers to aqueous dispersions of polymers containing urethane groups, as that term is understood by those of ordinary skill in the art. These polymers also incorporate hydrophilic functionality to the extent required to maintain a stable dispersion of the polymer in water. The compositions of the disclosure are aqueous dispersions that comprise a continuous phase comprising water, and a dispersed phase comprising polyurethane.

Following formation of the desired polyurethane dispersion, in the presence of solvent as discussed above, the pH can be adjusted to typically a pH about 7 to 9, if necessary, to insure conversion of ionizable groups to ionic groups. For example, if the typical dimethylolpropionic acid is the ionic or ionizable ingredient used in making the polyurethane, then sufficient aqueous base is added to convert the carboxyl groups to carboxylate anions.

Conversion to the aqueous dispersion is completed by addition of water. If desired, solvent can then be removed partially or substantially by distillation which can be done under reduced pressure.

Fillers, plasticizers, pigments, carbon black, silica sols, other polymer dispersions and the known leveling agents, wetting agents, antifoaming agents, stabilizers, and other additives known for the desired end use, can also be incorporated Ink Vehicle:

The ink vehicle is the liquid carrier (or medium) for the colorant(s) and optional additives. The term "aqueous vehicle" refers to a vehicle comprised of water or a mixture of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or an 1,2-alkanediols. Glycol ethers include, for example, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. The 1,2-alkanediol penetrants include linear, for example, 1,2-(C5 to C8)alkanediols and especially 1,2-pentanediol and 1,2-hexanediol.

An aqueous vehicle will typically contain about 50% to about 96% water with the balance (i.e., about 50% to about 4%) being the water-soluble solvent/humectant.

Aqueous Pigment Dispersion Preparation:

Sources of carbon black pigment are well known to those of ordinary skill in the art.

To prepare the dispersion, the pigment and amphoteric polyurethane dispersant are premixed. Typically the mixing device is a High Speed Disperser, which can be equipped with a Cowels type blade. The premixed pigment and amphoteric polyurethane dispersant are then dispersed or deflocculated in a milling step. The premixture includes an aqueous carrier medium (such as water and, optionally, a water-miscible solvent) when the milling step involves a wet milling operation. The milling can be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates can be prepared by dry milling the amphoteric polyurethane dispersant and the pigment under pressure. The media for the media mill is chosen from commonly available media, including zirconia, YTZ® (Nikkato Corporation, Osaka, Japan), and nylon. Typically the milled dispersion is filtered after the milling step. These various dispersion processes are in a general sense well-known in the art, as exemplified by U.S. Pat. Nos. 5,022,592; 5,026,427; 5,310,778; 5,891,231; 5,679,138; 5,976,232; and U.S. Patent Publication No. 2003/0089277. The pigment dispersion as made is typically in a concentrated form (dispersion concentrate), which is subsequently diluted with a suitable liquid containing the desired additives to make the final ink.

The range of useful particle sizes after dispersion is typically about 0.005 micron to about 15 micron. More typically, the pigment particle size should range from about 0.005 to about 5 micron and, most typically, from about 0.005 to about 1 micron. The average particle size as measured by dynamic light scattering is less than about 500 nm, more typically less than about 300 nm.

Colorant:

A wide variety of organic and inorganic pigments, alone or in combination, can be selected to make the colorant dispersion and first ink jet ink. The term "pigment" as used herein means an insoluble colorant. The pigment particles are sufficiently small to permit free flow of the ink through the ink jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) can be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much defocculation in the process of preparing the inks as pigments in dry form. Representative commercial dry pigments are listed in U.S. Pat. No. 5,085,698.

Some examples of pigments with coloristic properties useful in ink jet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I." designation established by Society Dyers and Colourists, Bradford, Yorkshire, UK and published in The Color Index, Third Edition, 1971. Commercial sources of pigment are generally well known in the art.

Some examples of useful black pigments include Nipex® 180, Nipex® 160, Nipex® 150 and Printex® 80 which are available from Degussa which is part Evonik Industries AG located in Essen, Germany. The following table summarizes the properties of these carbon black pigments.

TABLE

Carbon Black Pigments

| Type | Primary Particle Size, nm | Surface Area | Oil Absorption | % Volatile |
|---|---|---|---|---|
| Nipex ® 180 | 15 | 260 | 160 | 4.5 |
| Nipex ® 160 | 20 | 150 | 150 | 4.5 |
| Nipex ® 150 | 29 | 110 | 115 | 7 |
| Printex ® 80 | 16 | 220 | 100 | 1.2 |

In the case of organic pigments, the ink can contain up to approximately 30% pigment by weight, typically about 0.1 to about 25% pigment by weight, and more typically about 0.25 to about 10% pigment by weight, based on the total ink weight. If an inorganic pigment is selected, the ink will tend to contain higher weight percentages of pigment than with comparable inks employing organic pigment, and can be as high as about 75% in some cases, since inorganic pigments generally have higher specific gravities than organic pigments.

Additives:

Other ingredients, additives, can be formulated into the inkjet ink, to the extent that such other ingredients do not interfere with the stability and jettability of the ink, which can be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5 wt % and more typically in amounts of no more than 2 wt %. Optionally, defoamers can be used to remove air entrapment that occurs during premixing and/or milling steps.

Polymers can be included in the ink as an additive to improve durability of printed image and/or enhance the printer performance of the inks. These polymers can be added to the ink up to about 10 wt %, with 5 wt % being typical depending on impact on performance. Suitable polymers include acrylic copolymers, polymer latexes from emulsion polymerization, and polyurethane dispersions. Acrylic polymer additives preferably originate from a controlled polymerization techniques such as Group Transfer Polymerization (GTP) or Reversible-Addition Fragmentation Transfer (RAFT) polymerization. Block copolymers are particularly useful for improving durability of the printed image while maintaining excellent print performance. Polyurethanes are particularly effective in improving durability. Polymer additives can include the free addition of the same polymer used as the dispersant.

Biocides can be used to inhibit growth of microorganisms.

Pigmented ink jet inks typically have a surface tension in the range of about 20 mN·m$^{-1}$ to about 70 mN·m$^{-1}$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Method of Printing and Ink Sets:

Inkjet ink sets comprise at least two different inks which are used in combination to create the desired image. A typical printer will generally comprise at least four differently colored inks such as a cyan, magenta, yellow and black (CMYK) ink. Ink sets can further comprise one or more "gamut-expanding" inks, including different colored inks such as an orange ink, a green ink, a violet ink, a red ink and/or a blue ink, and combinations of full strength and light strengths inks such as light cyan and light magenta. In addition, ink sets can include one or more colorless inks which are printed in combination with the colored inks to enhance properties such as optical density, chroma, durability and/or gloss.

According to one embodiment of the disclosure, a method of ink jet printing onto a substrate is provided comprising, in any workable order, the steps of:

(a) providing an ink jet printer that is responsive to digital data signals;

(b) loading the printer with a substrate to be printed;

(c) loading the printer with an ink set comprising at least a first and second ink, wherein the first ink comprises an aqueous dispersion comprising a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanates; and the second ink comprises a second aqueous vehicle; and wherein the second ink or the substrate comprise a reactive species with appropriate cationic agent, salt, or pH modifying agent that can destabilize the aqueous dispersion of said first ink;

(d) printing said first and second ink on the substrate, in an abutting relationship to each other.

The second ink can be colored or colorless. In a typical embodiment, the second ink is colored and most typically a cyan, magenta or yellow ink in a multicolor ink set. Typically, a colored second ink comprises a dye colorant which, by definition, is soluble in the ink vehicle. The second vehicle can be the same or different than the first vehicle and is subject to similar compositional considerations as that herein before described for the colorant containing ink.

The selection of colorant for the second ink is well understood by one skilled in the art, and should be reactive with the amine block of the defined dispersant. Some examples of useful dyes include (cyan) Acid Blue 9 and Direct Blue 199; (magenta) Acid Red 52, Reactive Red 180, Acid Red 37 and Reactive Red 23; and (yellow) Direct Yellow 86, Direct Yellow 132 and Acid Yellow 23. The preceding dyes are referred to by their "C.I." designation established by Society Dyers and Colourists, Bradford, Yorkshire, UK and published in The Color Index, Third Edition, 1971.

Reactive species in the second ink can include an appropriate cationic agent, salt or a pH modifying agent. Reactive species can also include acid moieties such as sulfonic and carbonyl acid as part of the molecular structure of dyes or surfaces of pigments. The mechanism of bleed control results from the amine in the dispersant structure reacting with the reactive species, e.g. the acidic component in the second ink.

Alternately, the substrate may be pretreated with the reactive species. Commercially available treated substrates are known as treated papers, and suitable treated papers use ColorLok® technology as described in WO2007/044228.

Although not restricted to any particular viscosity range or printhead, the inks of the disclosure are particularly suited to lower viscosity applications. Thus the viscosity (at 25° C.) of the inks of this disclosure can be less than about 7 mPa·s, or less than about 5 mPa·s, and even, advantageously, less than about 3.5 mPa·s.

The inks of the present disclosure can be printed with any suitable inkjet printer, including printers equipped with piezo or thermal print heads. Some examples of thermal ink jet print heads are the Hewlett Packard Deskjet, and Canon iPIXMA iP4200, and some examples of piezo print heads are Brother MFC3360C, and Epson Stylus C120. Suitable print heads are disclosed in U.S. Pat. No. 6,161,918; U.S. Pat. No. 4,490,728; and U.S. Pat. No. 6,648,463. The substrate can be any suitable substrate including plain paper, such as common electrophotographic copier paper; treated paper, such as photo-quality inkjet paper. The present disclosure is particularly advantageous for printing on treated papers such as ColorLok® and plain paper wherein the reactive species is present in the second ink.

The following examples illustrate the disclosure without, however, being limited thereto.

EXAMPLES

The following examples are presented for the purpose of illustrating the invention and are not intended to be limiting. All parts, percentages, etc., are by weight unless otherwise indicated.

The dispersions whose preparation is described in the examples below were characterized in terms of their particle size and particle size distribution.

Ingredients and Abbreviations

BMEA=bis(methoxyethyl)amine
DBTL=dibutyltindilaurate
DMEA=dimethylethanolamine
DMIPA=dimethylisopropylamine
DMPA=dimethylol propionic acid
DMBA=dimethylol butyric acid
EDA=ethylene diamine
EDTA=ethylenediamine tetraacetic acid
HDI=1,6-hexamethylene diisocyanate
IPDI=isophoronediisocyanate
TMDI=trimethylhexamethylene diisocyanate
TMXDI=m-tetramethylene xylylene diisocyanate
NMP=n-Methyl pyrolidone
TEA=triethylamine
TEOA=triethanolamine
TETA=triethylenetetramine
THF=tetrahydrofuran
Tetraglyme=Tetraethylene glycol dimethyl ether Unless otherwise noted, the above chemicals were obtained from Aldrich (Milwaukee, Wis.) or other similar suppliers of laboratory chemicals.

TERATHANE® 650 is a 650 molecular weight, polytetramethylene ether glycol (PTMEG) from Invista, Wichita, Kans.

TERATHANE® 250 is a 250 molecular weight, polytetramethylene ether glycol (PTMEG)

Extent of Polyurethane Reaction

The extent of polyurethane reaction was determined by detecting NCO % by dibutylamine titration, a common method in urethane chemistry.

In this method, a sample of the NCO containing prepolymer is reacted with a known amount of dibutylamine solution and the residual amine is back titrated with HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free polyurethane dispersions was measured with a moisture analyzer, model MA50 from Sartorius. For polyurethane dispersions containing high boiling solvent, such as NMP, tetraethylene glycol dimethyl ether, the solid content was then determined by the weight differences before and after baking in 150° C. oven for 180 minutes.

MW Characterization

All molecular weights were determined by GPC (gel permeation chromatography) using poly(methyl methacrylate) standards with tetrahydrofuran as the eluent. Using statics derived by Flory, the molecular weight of the polyurethane can be calculated or predicted based on the NCO/OH ratio and the molecular weight of the monomers Amphoteric Polyurethane Dispersant 1: 11 IPDI/PO3G 700 2DMPA/1MDEA/BMEA A 2 L reactor was loaded with 134 g PO3G (700 MW), 43.3 g tetraethylene glycol dimethyl ether, and 26.3 g dimethylol proprionic acid. The mixture was heated to 115° C. with N2 purge for 1 hr. Then the reaction was cooled to 70° C., and 0.2 g dibutyl tin dilaurate was added. Over 60 minutes, 118.3 g isophorone diisocyanate were added followed by 19.5 g tetraethylene glycol dimethyl ether and 11.6 g N-Methyldiethanol amine. The reaction was held at 80° C. for 3.5 hrs when the % NCO was below 0.7%. Then, 12.9 g bis(2-methoxy ethyl)amine were added over 5 minutes. After 1 hr at 80° C., the amphoteric polyurethane solution was inverted under high speed mixing by adding a mixture of 45% KOH (22.1 g) and 77.1 g water followed by an additional 736.6 g water. The amphoteric polyurethane dispersion had a viscosity of 84 cPs and 24.7% solids. The polyurethane had a number average molecular weight of 7200, an amine number of 18.1 and an acid number of 36.7 mg KOH/g solids.

Amphoteric Polyurethane Dispersant 2: 11IPDI/PO3G700 1 DMPA/1 MDEA BMEA 30AN

A 2 L reactor was loaded with 128.5 g PO3G (700 MW), 54.2 g tetraethylene glycol dimethyl ether, and 21.9 g dimethylol proprionic acid. The mixture was heated to 115° C. with N2 purge for 1 hr. Then the reaction was cooled to 70° C., and 0.2 g dibutyl tin dilaurate was added. Over 60 minutes, 122.8 g isophorone diisocyanate were added followed by 33.4 g tetraethylene glycol dimethyl ether and 18.6 g N-Methyldiethanol amine. The reaction was held at 80° C. for 3.5 hrs when the % NCO was below 2.3%. Then, 13.8 g bis(2-methoxy ethyl)amine were added over 5 minutes. After 2 hr at 80° C., the amphoteric polyurethane solution was inverted under high speed mixing by adding a mixture of 45% KOH (28.3 g) and 64.2 g water followed by an additional 740.1 g water. The amphoteric polyurethane dispersion had a viscosity of 153 cPs and 25.3% solids. The amphoteric polyurethane had a number average molecular weight of 7600, an amine number of 29.1 and an acid number of 30.5 mg KOH/g solids.

Amphoteric Polyurethane Dispersant 3: 11IPDI/PO3G700 1DMPA/1MDEA BMEA 45AN

A 2 L reactor was loaded with 81.4 g PO3G (700 MW), 53.2 g tetraethylene glycol dimethyl ether, and 32.4 g dimethylol proprionic acid. The mixture was heated to 115° C. with N2 purge for 1 hr. Then the reaction was cooled to 74° C., and 0.4 g dibutyl tin dilaurate was added. Over 60 minutes 122.8 g isophorone diisocyanate was added followed by 58.4 g tetraethylene glycol dimethyl ether and 28.4 g N-Methyldiethanol amine. The reaction was held at 80° C. for 2 hrs when the % NCO was below 2.1%. Then, 15.9 g bis(2-methoxy ethyl)amine was added over 10 minutes. After 0.5 hr at 80° C., the polyurethane solution was inverted under high speed mixing by adding a mixture of 45% KOH (27.1 g) and 95.2 g water followed by an additional 696.8 g water. The polyurethane dispersion was 24.4% solids. The polyurethane had a number average molecular weight of 7200, an amine number of 44.6 and an acid number of 45.1 mg KOH/g solids.

Pigment Dispersion 1: Microfluidizer Process, (MF.)

Pigment Dispersion 1 was prepared using the Microfluidizer milling process outlined below:

A 900 gram dispersion sample was prepared by adding the following ingredients, in order, into a 1 Liter stainless steel pot. Each ingredient was added slowly with mixing using a High Speed Disperser, equipped with a 60 mm Cowels type blade, and operated at 1000 rpm. The targeted pigment loading in the premix stage was 23%.

| Ingredients | Amount (g) |
| --- | --- |
| Deionized Water | 85.5 |
| KOH (4.56% in Di Water) | 13.6 |
| TEB (triethylene glycol monobutyl ether) | 60.0 |
| 11 IPDI/PO3G 700 2DMPA/1MDEA/BMEA (36 Acid Number @ 25.3% solids 90% KOH Neutralized) | 142.4 |
| Nipex ® 180 carbon black pigment | 90.0 |

After completing the pigment loading, the High Speed Disperser speed was increased to 3500 rpm and the ingredients were premixed for 2 hours.

Next, additional DI water was added to reduce pigment loading to 15.0% which is the level used during milling.

| Ingredients | Amount (g) |
| --- | --- |
| Deionized Water | 208.5 |

The dispersion was milled for 12 passes at a flow rate of 350 ml/min and 15,000 psi through the Microfluidizer, that is a labscale model M-110Y High Pressure Pneumatic Microfluidizer, with a Z-Chamber available from Microfluidics of Newton, Mass.

The dispersion was then Ultrafiltered through a model UFP-300-E-4MA hollow fiber cartridge available from GE Healthcare to remove the TEB cosolvent and some of the ionic impurities. During Ultrafiltration additional DI Water was added to the dispersion to reduce the pigment loading to the target level of 10.0%.

| Ingredients | Amount (g) |
| --- | --- |
| Deionized Water | 300.0 |

The dispersion was then filled into a 1000 ml polyethylene container. The dispersion was tested for pH, viscosity, particle size (D50 and D95), Accusizer (bigs) and are reported in the Table 2 below. In addition the dispersion was tested for 1 week oven stability at 70 degrees Celsius in which no significant change was indicative of a good, stable dispersion.

Pigment Dispersion 2 was prepared using the above described Microfluidizer milling process using the dispersants, pigments, % pigment loading and P/D identified in Table 2 below.

Pigment Dispersion 3 is also a Nipex® 180 carbon black dispersion that is also made using the Microfluidizer process at 12 passes at 15,000 psi. in which the Dispersant 3, 11 IPDI/PO3G 700 1DMPA/1MDEA/BMEA 45 Acid Number, 90% KOH neutralized is used.

TABLE 3-continued

| Ingredient | Weight % |
| --- | --- |
| Glycereth-26 | 5 |
| Water (to 100%) | Balance |

Inks based on black Pigment Dispersion 3 were also prepared using the formulation in Table 4 and printed using the Pixma 4200 printer with OEM CYM.

TABLE 4

| Ingredient | Weight % |
| --- | --- |
| Pigment Dispersion (as wt % pigment) | 3.3 |
| 1,3 propane diol | 11 |
| Surfynol ® 465 | 0.25 |
| Glycereth-26 | 3 |
| Water (to 100%) | Balance |

TABLE 2

| Pigment Dispersion | Dispersant Composition | Pigment | % Pig | P/D | pH [1] | Viscosity (cps) [2] | D50 [3] | D95 [3] | Accusizer [4] (bigs) × 10[7] |
| --- | --- | --- | --- | --- | --- | --- | --- | --- | --- |
| 1 | 11 IPDI/PO3G 700 2DMPA/1MDEA/BMEA 36 Acid Number, 90% KOH neutralized | Nipex ® 180 | 9.56 | 2.5 | 9.58 | 2.96 | 111 | 167 | 8 |
|  | (1 week oven Stablity @ 70 C.) | — | — | — | 8.50 | 2.88 | 111 | 180 | — |
| 2 | 11 IPDI/PO3G 700 1DMPA/1MDEA/BMEA 30 Acid Number, 90% KOH neutralized | Nipex ® 180 | 9.64 | 2.5 | 9.63 | 3.02 | 108 | 174 | 7 |
|  | (1 week oven Stablity @ 70 C.) | — | — | — | 8.64 | 2.85 | 109 | 170 | — |
| 3 | 11 IPDI/PO3G 700 1DMPA/1MDEA/BMEA 45 Acid Number, 90% KOH neutralized (1 week oven Stablity @ 70 C.) | Nipex ® 180 | 10.00 | 2.5 |  |  |  |  |  |

[1] pH was measured using a model 511201 pH meter available from Beckman Coulter, Inc. of Fullerton, CA.
[2] Viscosity was measured using a model LVDV-II + Pro Brookfield Viscometer available from Brookfield Engineering Laboratories, Inc. of Middleboro, MA using a 00 Spindle and UL1 adapter.
[3] Particle size measurements were made using a Model NAS 35 Nanotrac Auto Sampler available from Microtrac Inc. of Largo, FL.
[4] Accusizer or bigs measurements were made using a Model 780A Accusizer Nanotrac available from Agilent Inc. of Santa Clara, CA.

Ink Preparation:

Inks were prepared by stirring together the pigment dispersion and other ink ingredients according to the same general formulation summarized in the following table. The dispersion was added in an amount that provided 3% pigment solids in the final ink. The ink formulations for inks based on Pigment Dispersions 1 and 2 are summarized in the Table 3. A comparative ink with the same formulation was also prepared using Cab-o-jet® C-300 (Cabot Corp.) self dispersed black pigment dispersion.

TABLE 3

| Ingredient | Weight % |
| --- | --- |
| Pigment Dispersion (as wt % pigment) | 3 |
| glycerol | 10 |
| 1,2 hexanediol | 4 |
| Ethylene glycol | 5 |
| Surfynol ® 465 | 1 |
| 2-Pyrrolidone | 3 |

Optical Density Evaluation

The black inks were tested for OD print performance potential using the following drawdown procedure. Drawdowns were made of ink over Xerox 4200 paper using a #5 wire wound rod. For ink testing over reactive species treated paper, a 3% Ca(NO3)2 aqueous solution was drawn down (#5 wire wound rod) on Xerox 4200 paper. The paper was allowed to dry for at least 2 hours prior to drawing down ink.

Optical Densities were Measured Using an X-Rite® Spectrophotometer and are Presented in the Following Table

| Reactive Species on X4200 | Pigment Dispersion 1 | Pigment Dispersion 2 | Comparative Ink |
| --- | --- | --- | --- |
| none | 0.90 | 0.91 | 0.93 |
| Ca(N03)2 | 1.34 | 1.36 | 1.23 |

Inks based on black Pigment Dispersion 3 printed using the Pixma 4200 printer with OEM CYM resulted in an optical density of 1.38 on Canon Office Planner paper.

We claim:

1. An aqueous dispersion comprising a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanate groups, and wherein the amphoteric polyurethane dispersant comprises at least one compound of the general structure (I):

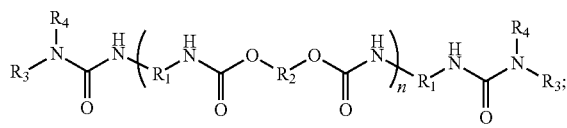

$R_1$=$C_4$-$C_{20}$ alkylene, cyclic alkylene, $C_4$-$C_{20}$ alkyl/arylene from diisocyanate;
$R_2$=a mixture comprising at least one $Z_1$, at least one $Z_2$, and at least one $Z_3$;
$R_3$=$C_3$-$C_{20}$ alkyl/branched alkyl with optional ether spacer atoms, and an optional isocyanate reactive group from an amine terminating or chain extending component;
$R_4$=hydrogen, $C_3$-$C_{20}$ alkyl/branched $C_3$-$C_{20}$ alkyl with optional ether spacer atoms, and an optional isocyanate reactive group from an amine terminating group;
where the isocyanate reactive group is selected from the group consisting of hydroxyl, carboxyl, mercapto, or amido;
$Z_1$=acid urethane monomer unit derived from acid functional diol;
$Z_2$=basic amine urethane monomer derived from tertiary amine functional diol;
$Z_3$ is selected from the group consisting of polyester, polyether, polycarbonate, polyestercarbonate, and polyacrylate diols; and wherein the urea content of the urea-terminated polyurethane is at least 2 wt % of the polyurethane and at most about 14 wt % of the polyurethane.

2. The aqueous dispersion of claim 1, wherein the reaction product further comprises at least one urethane monomer comprising a polyol having at least two alcohol functionalities.

3. The aqueous dispersion of claim 1, wherein the basic amine urethane monomer comprises an ionic group.

4. The aqueous dispersion of claim 3, wherein the basic amine urethane monomer ionic group is selected from the group consisting of a primary amine (—$NH_2$), a secondary amine (—NRH), and a tertiary amine, (—$NR_2$).

5. The aqueous dispersion of claim 1, wherein the acidic urethane monomer ionic group is selected from the group consisting of a carboxylic group (—COOH), phosphate group (—$OPO_3$ M2), phosphonate group (—$PO_3$ M2), and a sulfonate group (—$SO_3$ M).

6. The aqueous dispersion of claim 1, wherein the dispersion has a pH of >7.

7. The aqueous dispersion of claim 1, wherein the amphoteric polyurethane dispersant has a number average molecular weight (Mn) of between about 2000 and about 20,000 Daltons.

8. The aqueous dispersion of claim 1, wherein the amphoteric polyurethane dispersant has an amine number and an acid number, and the ratio of the amine number to acid number is about 0.5 to about 1.5.

9. The aqueous dispersion of claim 1, wherein the colorant is a pigment.

10. The aqueous dispersion of claim 9, wherein the pigment is a black pigment.

11. An ink jet ink comprising an aqueous dispersion, wherein the aqueous dispersion comprises a colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanate groups, and wherein the aphoteric polyurethane dispersant comprises at least one compound of the general structure (I):

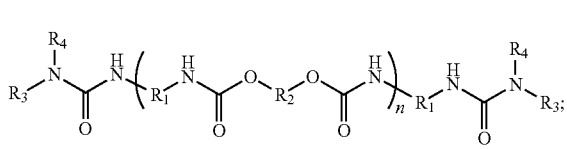

$R_1$=$C_4$-$C_{20}$ alkylene, cyclic alkylene, $C_4$-$C_{20}$ alkyl/arylene from diisocyanate;
$R_2$=a mixture comprising at least one $Z_1$, at least one $Z_2$, and at least one $Z_3$;
$R_3$=$C_3$-$C_{20}$ alkyl/branched alkyl with optional ether spacer atoms, and an optional isocyanate reactive group from an amine terminating or chain extending component;
$R_4$=hydrogen, $C_3$-$C_{20}$ alkyl/branched $C_3$-$C_{20}$ alkyl with optional ether spacer atoms, and an optional isocyanate reactive group from an amine terminating group;
where the isocyanate reactive group is selected from the group consisting of hydroxyl, carboxyl, mercapto, or amido;
$Z_1$=acid urethane monomer unit derived from acid functional diol;
$Z_2$=basic amine urethane monomer derived from tertiary amine functional diol;
$Z_3$ is selected from the group consisting of polyester, polyether, polycarbonate, polyestercarbonate, and polyacrylate diols; and wherein the urea content of the urea-terminated polyurethane is at least 2 wt % of the polyurethane and at most about 14 wt % of the polyurethane.

12. The ink jet ink of claim 11, further comprising an ink vehicle, wherein the ink vehicle is water or a mixture of water and an organic solvent.

13. The ink jet ink of claim 11, wherein the amphoteric polyurethane dispersant is present in the amount of about 0.3% to about 5.0%, based on the total weight of the ink.

14. An ink set comprising a first ink and a second ink, wherein the first ink comprises an aqueous dispersion comprising colorant and an amphoteric polyurethane dispersant, wherein the amphoteric polyurethane dispersant comprises a reaction product of at least one basic amine urethane monomer, at least one acidic urethane monomer, and at least one urethane monomer comprising two or more isocyanate groups; wherein the amphoteric polyurethane dispersant comprises at least one compound of the general structure (I):

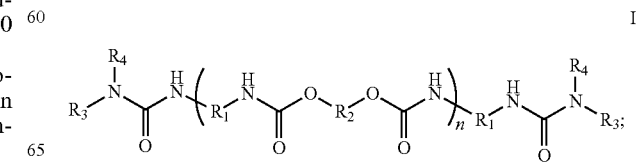

$R_1 = C_4$-$C_{20}$ alkylene, cyclic alkylene, $C_4$-$C_{20}$ alkyl/arylene from diisocyanate;

$R_2$ = a mixture comprising at least one $Z_1$, at least one $Z_2$, and at least one $Z_3$;

$R_3 = C_3$-$C_{20}$ alkyl/branched alkyl with optional ether spacer atoms, and an optional isocyanate reactive group from an amine terminating or chain extending component;

$R_4$ = hydrogen, $C_3$-$C_{20}$ alkyl/branched $C_3$-$C_{20}$ alkyl with optional ether spacer atoms, and an optional isocyanate reactive group from an amine terminating group;

where the isocyanate reactive group is selected from the group consisting of hydroxyl, carboxyl, mercapto, or amido;

$Z_1$ = acid urethane monomer unit derived from acid functional diol;

$Z_2$ = basic amine urethane monomer derived from tertiary amine functional diol;

$Z_3$ is selected from the group consisting of polyester, polyether, polycarbonate, polyestercarbonate, and polyacrylate diols; and wherein the urea content of the urea-terminated polyurethane is at least 2 wt % of the polyurethane and at most about 14 wt % of the polyurethane;

and the second ink comprises a second aqueous vehicle and reactive species that can destabilize the aqueous dispersion of said first ink; and wherein the reactive species is selected from the group consisting of a cationic agent, a salt, and a pH modifying agent.

15. The aqueous dispersion of claim 1, wherein $R_1$ is selected from the group consisting of toluene, trimethyl hexamethylene, diphenylmethylene, dicyclohexylmethylene, dimethyl biphenylene, dodecylene, tetramethylene xylylene, phenylene, cyclohexylene, naphthalene, hexamethylene, xylylene, and isphorene.

16. The aqueous dispersion of claim 1, wherein:

$R_3$ and $R_4$ are selected from the group consisting of alkyl and alkoxy.

17. The aqueous dispersion of claim 1, wherein a basic amine urethane monomer comprises MDEA, BMEA, or both; an acidic urethane monomer comprises DMPA; and a urethane monomer comprising two isocyanate groups comprises IPDI.

18. The ink jet ink of claim 11, wherein $R_1$ is selected from the group consisting of toluene, trimethyl hexamethylene, diphenylmethylene, dicyclohexylmethylene, dimethyl biphenylene, dodecylene, tetramethylene xylylene, phenylene, cyclohexylene, naphthalene, hexamethylene, xylylene, and isphorene.

19. The ink jet ink of claim 11, wherein:

$R_3$ and $R_4$ are selected from the group consisting of alkyl and alkoxy.

20. The ink jet ink of claim 11, wherein a basic amine urethane monomer comprises MDEA, BMEA, or both; an acidic urethane monomer comprises DMPA; and a urethane monomer comprising two isocyanate groups comprises IPDI.

* * * * *